Sept. 8, 1942.    G. H. GLOSS ET AL    2,295,105
MANUFACTURE OF MAGNESIUM METAL
Filed July 9, 1941
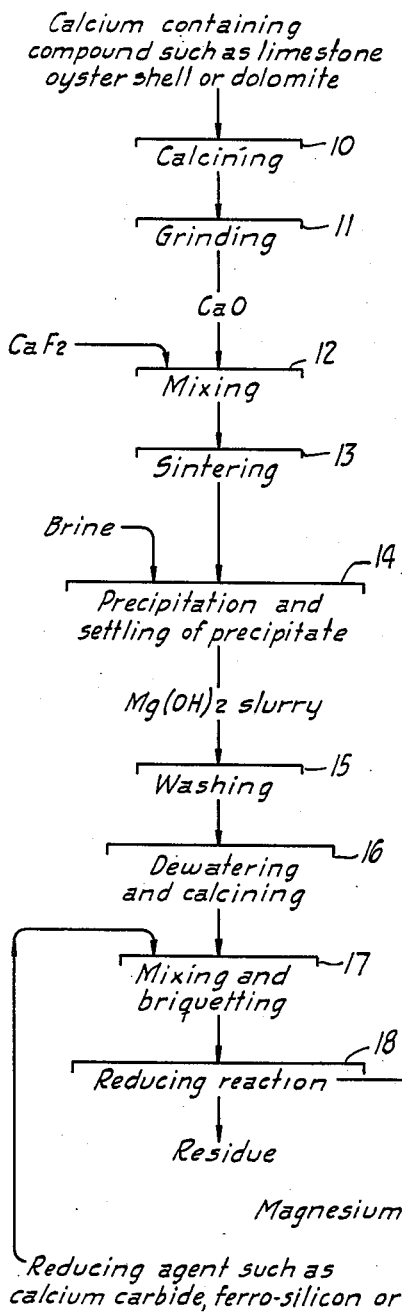
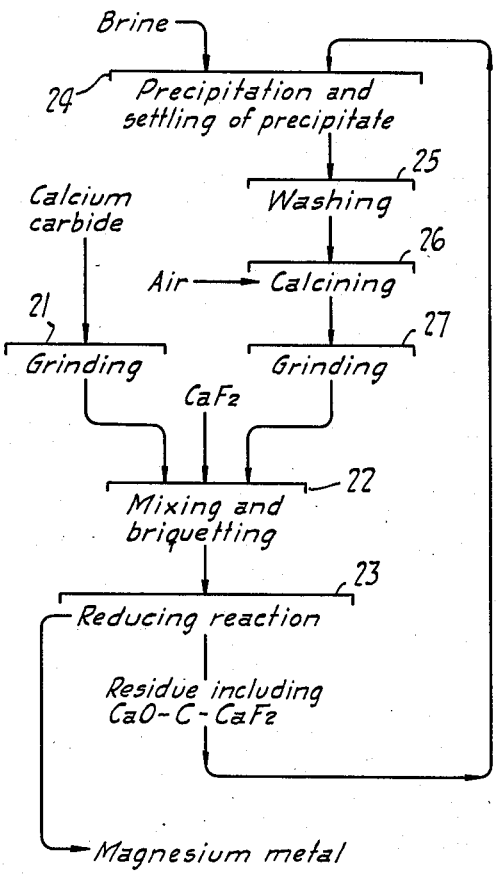
INVENTORS
GUNTER H. GLOSS
ROBERT E. CLARKE
BY
ATTORNEY Patented Sept. 8, 1942

2,295,105

UNITED STATES PATENT OFFICE 2,295,105

MANUFACTURE OF MAGNESIUM METAL

Gunter H. Gloss, Belmont, and Robert E. Clarke, Palo Alto, Calif., assignors to Marine Magnesium Products Corporation, South San Francisco, Calif., a corporation of Delaware Application June 9, 1941, Serial No. 397,176

8 Claims. (Cl. 75—67)

This invention relates generally to the manufacture of magnesium metal from magnesium products like magnesium oxide. In particular, the invention relates to processes of this character in which the magnesium oxide employed is obtained from brines containing convertible magnesium salts, such as sea water.

In the past, magnesium products have been manufactured from brines containing convertible magnesium salts, including sea water, by reacting the brine with lime or lime-bearing materials, followed by processing of the precipitated magnesium hydroxide to produce a product such as magnesium oxide, magnesium carbonate, and various forms of magnesium hydroxide. Magnesium products produced in this manner can be used in the manufacture of magnesium metal.

In our copending application, Serial No. 397,072, filed June 7, 1941, we have disclosed an improved process for the manufacture of magnesium products from brines containing convertible magnesium salts, which involves the use of a sintered precipitant made by sintering lime or a lime-bearing material with a fluoride like calcium fluoride. A precipitant prepared in this manner makes possible a relatively high settling rate with relatively dilute brines such as sea water.

In connection with the manufacture of magnasium metal from magnesium products such as magnesium oxide, it has been known that the presence of small amounts of fluoride, such as calcium, sodium, potassium or magnesium fluorides, may be beneficial. Thus, the presence of small amounts of such fluorides in the ferrosilicon, calcium carbide, or carbothermic processes, serves to activate the reducing reaction, thus making possible better yields and promoting purity of the metal produced. In the electrolytic process, small amounts of fluorides in an electrolyte consisting mainly of magnesium chloride, may be advantageous for the purpose of increasing its specific gravity.

It is an object of the present invention to provide an improved process involving manufacture of magnesium metal from magnesium oxide obtained from a brine such as sea water. The present process is characterized by production of a fast settling precipitate from the brine plus an activated reaction for the production of magnesium metal. In attaining this object, we make use of a fluoride like calcium fluoride both for the purpose of producing a sintered lime-bearing material for reaction with the brine, and for the purpose of activating or catalyzing the magnesium-producing reaction.

Further objects of the invention will appear from the following description in which the preferred embodiments have been set forth in detail in conjunction with the accompanying drawing.

Referring to the drawing:

Figure 1 is a flow sheet illustrating one embodiment of the process; and

Figure 2 is another flow sheet illustrating a second embodiment.

As set forth in our copending application Serial No. 397,072, filed June 7, 1941, in the past various calcium-bearing materials, such as limestone, oyster shells, or dolomite, have been calcined for the purpose of forming an available source of lime for reaction with a brine containing convertible magnesium salts. We further disclose in said application that when calcium oxide is heated to an elevated temperature with material like calcium fluoride, a definite sintering action takes place, and this sintered material when reacted with a given brine will produce a magnesium hydroxide precipitate which is considerably faster settling and more crystalline than the precipitate produced by the unsintered calcium oxide.

The process of application Serial No. 397,072, filed June 7, 1941, is used in connection with the present invention to provide the necessary magnesium oxide for the remainder of the process. This oxide is obtained together with the fluoride from the precipitant employed, and this fluoride is utilized to catalyze or aid the remainder of the process.

Figure 1 illustrates one way in which the invention can be practiced. A suitable calcium-containing compound such as limestone, oyster shell, or dolomite, is subjected to the conventional calcining operation 10, whereby the calcium content is converted to calcium oxide. The calcined material is then subjected to grinding at 11, and the ground material is then intermixed with suitable amounts of calcium fluoride. The amount of fluoride employed may vary between reasonable limits. For example, with ordinary calcined limestone, the amount of calcium fluoride employed can vary from say 1 to 5%.

After intermixture of the calcium fluoride with the calcium oxide at 12, the mixed material is subjected to the sintering operation 13 at elevated temperatures such as of the order of from 700 to 1,100° C. This operation should be continued sufficiently long to secure a decided sintering action, as for example for an interval such as from 30 to 60 minutes. The sintered material is then prepared for use as a precipitant. The fastest settling rate can be secured by grinding the sintered material to the form of a powder, which is then directly intermixed with brine to be precipitated, in operation 14. However, it is also possible to slake the material with water to form a slurry, which is then contacted with the brine.

In operation 14 the precipitant is intermixed with brine and held for a sufficient period of time to substantially complete the reaction, after which the material is introduced into a suitable settling tank, and the precipitate permitted to settle down to the bottom of the tank to form a thickened slurry. The thickened slurry is then shown being subjected to the washing operation 15 for the purpose of removing soluble impurities like sodium chloride, after which the washed slurry is subjected to the dewatering and calcining operation 16.

The calcining operation 16 forms the magnesium oxide for further use in the process. This magnesium oxide contains the calcium fluoride introduced into the operation 12, because this fluoride settles out and remains with the magnesium hydroxide. Operation 17 represents the intermixing of the magnesium oxide with a reducing agent, after which the mixture is compressed into briquets for the reducing reaction 18. The reducing action is carried out under conditions of pressure and temperature depending upon the character of the reducing agent employed. If the reducing agent is calcium carbide, the reaction can be carried out in a sealed retort maintained under a vacuum such as from 1 to 10 mm. of mercury, and at an elevated temperature such as from 1,050 to 1,200° C. If the reducing agent is ferrosilicon, somewhat higher temperatures are required, such as of the order of 1,300° C. If the reducing agent is carbon, as in the carbo-thermic process, temperatures of the order of 2,500° C. can be employed, and provision must be made for quickly chilling the evolved magnesium vapor in order to prevent a reversible reaction with the carbon monoxide present. If the reducing agent is ferrosilicon, some additional calcium oxide should be provided to the intermixing and briquetting operation 17. All such procedures for the reducing action are known to those skilled in the art, and need not be described in detail.

The calcium fluoride which is sintered with the lime in operation 13 remains in the magnesium oxide produced by calcining operation 16, as a fluoride or fluosilicate, and is therefore homogeneously dispersed throughout the briquets being subjected to the reducing action 18. In the reducing action this fluoride content activates or catalyzes the reaction, to promote a relatively high yield of magnesium metal, and to promote the production of a relatively pure metal. In connection with purity of the metal, it should be noted that in the carbo-thermic process previously mentioned, the magnesium metal as first produced is in the form of a powder. This powder is again briquetted and subjected to distillation for production of a relatively pure metal. In the calcium carbide and ferrosilicon processes, the evolved magnesium vapor is directly condensed as a relatively pure liquid or solid.

In some instances it may be desirable to use an amount of calcium fluoride in operations 12 and 13 which is insufficient for optimum results in the reducing reaction 18. In such instances additional amounts of calcium fluoride can be supplied to the mixing and briquetting operation 17.

Particular reference has been made to the use of calcium fluoride for the purpose of securing a fast settling precipitate, and for the purpose of catalyzing the reaction for manufacture of magnesium metal. In addition to calcium fluoride, it appears that other fluorides can be employed, such as sodium, potassium and magnesium fluorides or fluosilicates. Calcium fluoride is particularly desirable because of its low cost. Limestone or lime-bearing minerals contain varying amounts of silica. A reaction may take place in the sintering operation 13 between the fluoride and the silica to form calcium fluosilicates, thereby increasing the binding action and sintering effect of the original fluoride.

The embodiment shown in Figure 2 is particularly adapted for use with calcium carbide as a reducing agent. Thus, calcium carbide is shown being subjected to grinding 21, and the ground material is supplied to the mixing and briquetting operation 22, where it is intermixed and briquetted with magnesium oxide. The briquets are then supplied to the reducing reaction 23, and as a result of this reaction a residue is formed which includes calcium oxide and carbon, together with small and varying amounts of unreacted magnesium oxide and calcium carbide. This reaction is shown being utilized in the precipitating operation 24, where the calcium oxide of the residue reacts with a brine such as sea water for the precipitation of magnesium hydroxide. Preparatory to contacting the residue with the brine, it can be slaked to form a slurry, or it can be ground and utilized as a dry powdered material. The precipitated magnesium hydroxide slurry is shown being supplied to the washing operation 25, for removal of soluble impurities such as sodium chloride, and the washed material is then supplied to the calcining operation 26, where the magnesium hydroxide is converted to magnesium oxide.

The heat required for the calcining operation 26 can be supplied partly or entirely by burning of the carbon content, which is recovered from the precipitating operation 24, together with the magnesium hydroxide slurry. For this reason, the calcining operation 26 is shown being supplied with air for burning of the carbon. The calcined material from 26 is shown being ground at 27 for supplying the mixing and briquetting operation 22.

To carry out the process of Figure 2 in accordance with the present invention, a small amount of calcium fluoride is bled into the process, as for example into the mixing and briquetting operation 22, as indicated. As previously pointed out, this calcium fluoride serves to catalyze and facilitate the reducing reaction 23, particularly in promoting efficiency of reaction and in facilitating the production of pure magnesium metal. Also, by utilizing small amounts of calcium fluoride in reaction 23, the resulting residue is sintered with calcium fluoride, and this sintered material when ground and utilized as a precipitant in operation 24 produces a faster settling and more crystalline precipitated magnesium hydroxide. Calcium fluoride passing out with the residue from operation 23 is returned back into the process, because it leaves operation 24 together with the magnesium hydroxide. Therefore, when the process is operated cyclically in this fashion only sufficient calcium fluoride need be introduced into the process to compensate for loss of this material.

The amount of residue produced according to the process of Figure 2 will be more than sufficient to precipitate a sufficient amount of magnesium hydroxide for carrying out the reducing reaction 23, because of the excessive calcium oxide contained as an impurity in the commercial carbide. Therefore, in order to balance the process one may either bleed off a certain amount of the residue, or one may bleed off a certain amount of the precipitated magnesium hydroxide.

The magnesium hydroxide produced by the process of Figure 1 can be utilized for production of magnesium metal by the electrolytic process. In this event the magnesium hydroxide is converted by known procedures to purified and anhydrous magnesium chloride. In some electrolytic processes, calcium fluoride is considered advantageous, and therefore it can be permitted to merge with the magnesium chloride to form the electrolyte. If calcium fluoride is not desired in the electrolyte, it can be removed during purification of the magnesium chloride, or sodium, magnesium or potassium fluorides can be used in place of calcium fluoride, as sintering agents.

We claim:

1. In a process of the character described, the steps of sintering calcium oxide with a fluoride, reacting the sintered material with brine containing covertible magnesium salts to precipitate magnesium hydroxide, recovering the precipitated magnesium hydroxide from the mother liquid of the brine together with the fluoride content of the sintered material, and then reducing the recovered material to produce magnesium metal, said last step being facilitated by the presence of the fluoride content.

2. In a process of the character described, the steps of sintering calcium oxide with a fluoride, reacting the sintered material with a brine to precipitate magnesium hydroxide, recovering the magnesium hydroxide from the mother liquor together with the fluoride content of the sintered material, calcining the recovered material and then reacting the calcined material with a reducing agent at an elevated temperature to produce magnesium metal, the reducing reaction being catalyzed by the presence of fluoride.

3. In a process as in claim 2 in which the reducing agent is calcium carbide.

4. In a process as in claim 2 in which the reducing agent is ferro silicon.

5. In a process as in claim 2 in which the reducing agent is carbon.

6. In a process of the character described, the steps of sintering calcium oxide with calcium fluoride, reacting the sintered material with brine containing convertible magnesium salts to precipitate magnesium hydroxide, recovering the precipitated magnesium hydroxide from the mother liquor together with the fluoride content of the sintered material, calcining the recovered material and then reacting the calcined material with a reducing agent at an elevated temperature to produce magnesium metal, the reducing reaction being catalyzed by the presence of the fluoride.

7. In a process of the character described, the steps of sintering calcium oxide with a fluoride, reacting the sintered material with brine containing convertible magnesium salts to precipitate magnesium hydroxide, recovering the precipitated magnesium hydroxide from the mother liquor together with the fluoride content of the sintered material, calcining the recovered material, reacting the calcined material with calcium carbide at an elevated temperature to produce magnesium metal and to produce a sintered residue containing calcium oxide, the reducing reaction being catalyzed by the presence of fluoride, and reusing the sintered calcium oxide of the residue as a precipitant for the process.

8. In a process of the character described, forming a mixture consisting of calcium carbide, calcium oxide and calcium fluoride, causing a reaction within the mixture by heating the same to an elevated temperature while being subjected to a vacuum whereby magnesium metal is produced and whereby a sintered residue is formed including calcium oxide, and utilizing the residue as a precipitant and to react with a brine containing convertible magnesium salts thereby forming a magnesium hydroxide available for use in the process.

ROBERT E. CLARKE.
GUNTER H. GLOSS.